United States Patent
Jung

(10) Patent No.: US 9,860,821 B2
(45) Date of Patent: Jan. 2, 2018

(54) METHOD AND APPARATUS FOR SECURE ACCESS CONTROLLING OF TERMINAL

(71) Applicant: Electronics and Telecommunications Research Institute, Daejeon (KR)

(72) Inventor: Woo Sug Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 101 days.

(21) Appl. No.: 14/834,610

(22) Filed: Aug. 25, 2015

(65) Prior Publication Data
US 2016/0219492 A1    Jul. 28, 2016

(30) Foreign Application Priority Data

Jan. 27, 2015  (KR) .................... 10-2015-0013055

(51) Int. Cl.
| | | |
|---|---|---|
| H04M 1/66 | (2006.01) | |
| H04W 48/04 | (2009.01) | |
| H04W 4/02 | (2009.01) | |
| H04W 12/08 | (2009.01) | |

(52) U.S. Cl.
CPC ............. *H04W 48/04* (2013.01); *H04W 4/02* (2013.01); *H04W 4/028* (2013.01); *H04W 12/08* (2013.01)

(58) Field of Classification Search
CPC ....... H04W 48/04; H04W 4/02; H04W 12/02; H04W 64/00
USPC ........................................................ 455/411
See application file for complete search history.

(56) References Cited

U.S. PATENT DOCUMENTS

| | | | | |
|---|---|---|---|---|
| 2001/0034239 A1* | 10/2001 | Yamato | ............ | G08G 1/096716 455/456.6 |
| 2002/0173905 A1* | 11/2002 | Jin | .......................... | G01C 21/20 701/408 |
| 2004/0267551 A1* | 12/2004 | Yadav | .............. | G06Q 10/06375 455/456.1 |
| 2005/0075119 A1* | 4/2005 | Sheha | .................... | G01C 21/26 455/456.6 |

(Continued)

FOREIGN PATENT DOCUMENTS

| | | |
|---|---|---|
| KR | 1020090016922 A | 2/2009 |
| KR | 1020090042503 A | 4/2009 |
| KR | 1020120066733 A | 6/2012 |

*Primary Examiner* — William Nealon
(74) *Attorney, Agent, or Firm* — William Park & Associates Ltd.

(57) ABSTRACT

Provided herein is an apparatus and method for secure access controlling of a terminal, and more particularly, to a method for secure access controlling of a terminal configured to analyze a behavior pattern of the terminal based on location tracking and path anticipating of the terminal, compare a current location and an anticipated path so as to restrict secure access when an abnormality is discovered from the behavior pattern, and an apparatus thereof, the method including inferring an anticipated path of the terminal based on location information of the terminal collected on a predetermined cycle; determining whether or not the terminal deviated from the anticipated path by comparing a current location of the terminal and the anticipated path of the terminal; and in response to determining that the terminal deviated from the anticipated path, rejecting a secure access request of the terminal.

14 Claims, 7 Drawing Sheets

(56) References Cited

U.S. PATENT DOCUMENTS

| | | | |
|---|---|---|---|
| 2008/0290988 A1* | 11/2008 | Crawford | G07C 9/00103 340/5.6 |
| 2009/0247137 A1* | 10/2009 | Awad | H04M 3/2227 455/418 |
| 2010/0151826 A1 | 6/2010 | Tischer et al. | |
| 2011/0148633 A1* | 6/2011 | Kohlenberg | G06F 21/30 340/541 |
| 2012/0052817 A1 | 3/2012 | Lee et al. | |
| 2012/0150444 A1 | 6/2012 | Hong et al. | |
| 2014/0293871 A1 | 10/2014 | Jung | |
| 2016/0066141 A1* | 3/2016 | Jain | H04W 4/021 455/456.1 |

* cited by examiner

METHOD AND APPARATUS FOR SECURE ACCESS CONTROLLING OF TERMINAL

CROSS-REFERENCE TO RELATED APPLICATION

The present application claims priority to Korean patent application number 10-2015-0013055, filed on Jan. 27, 2015, the entire disclosure of which is incorporated herein in its entirety by reference.

BACKGROUND

Field of Invention

Various embodiments of the present invention relate to a method for secure access controlling of a terminal and an apparatus thereof, and more particularly, to a method for secure access controlling of a terminal configured to analyze a behavior pattern of the terminal based on location tracking and path anticipating of the terminal, compare a current location and an anticipated path so as to restrict secure access when an abnormality is discovered from the behavior pattern, and an apparatus thereof.

Description of Related Art

As mobile communication environments develop rapidly due to the recent increased supply of smart terminals, various application services such as financial transactions and office processing that require security are being provided through mobile environments.

Today's mobile environments provide secure access controlling services that use user accounts and passwords or information on terminals themselves.

However, such a conventional method has a disadvantage of weak security in case secure access information such as IDs/passwords or information on terminals themselves is exposed when the terminals are lost or personal information is leaked.

In order to compensate this disadvantage, recently, secure access methods using location information on terminals have been suggested, but conventional methods related to these methods merely restrict hardware resources when terminals are located in certain areas, and thus there occurs a problem that secure access may not be restricted for terminals located in places other than those certain areas.

SUMMARY

According to an embodiment of the present invention, there is provided a method for secure access controlling a terminal, the method including inferring an anticipated path of the terminal based on location information of the terminal collected on a predetermined cycle; determining whether or not the terminal deviated from the anticipated path by comparing a current location of the terminal and the anticipated path of the terminal; and in response to determining that the terminal deviated from the anticipated path, rejecting a secure access request of the terminal.

According to another embodiment of the present invention, there is provided an apparatus for secure access controlling of a terminal, the apparatus including a communication unit configured to receive location information on the terminal collected on a predetermined cycle; and a control unit configured to infer an anticipated path of the terminal based on the location information of the terminal collected on the predetermined cycle, compare a current location of the terminal and the anticipated path of the terminal, determine whether or not the terminal deviated from the anticipated path, and in response to determining that the terminal deviated from the anticipated path, reject a secure access request of the terminal.

A method for secure access controlling of a terminal and an apparatus thereof according to the present disclosure strengthens security in mobile environments by using information obtained by analyzing a behavior pattern in addition to conventional secure access methods.

Furthermore, a method for secure access controlling of a terminal and an apparatus thereof according to the present disclosure provide secure access control services with strengthened security not only in offices but also outside the offices, thereby providing a same working environment in and outside the offices such as smart offices.

BRIEF DESCRIPTION OF THE DRAWINGS

The above and other features and advantages of the present invention will become more apparent to those of ordinary skill in the art by describing in detail embodiments with reference to the attached drawings in which.

DETAILED DESCRIPTION

Figure 1:
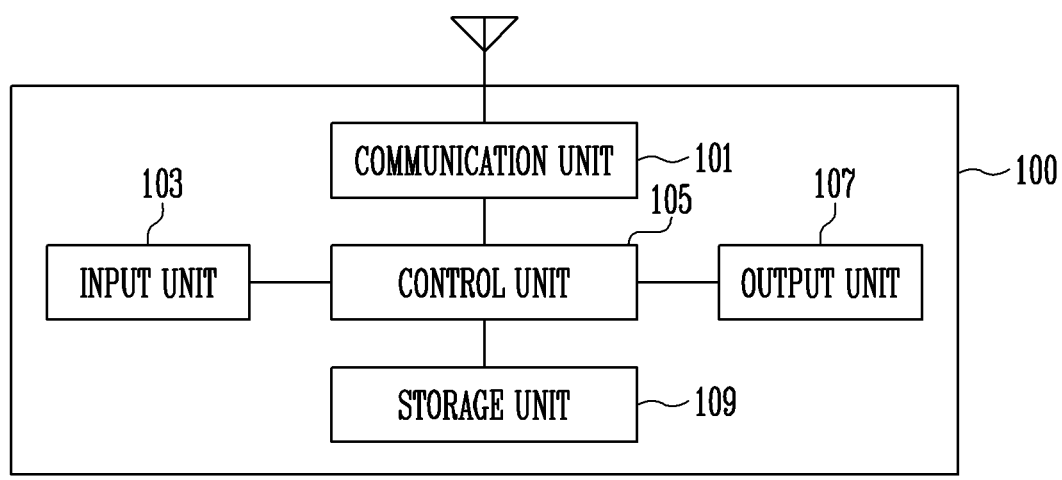
FIG. 1 is a block diagram illustrating a configuration of an apparatus for secure access controlling of a terminal according to the present disclosure.

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected/accessed' represents that one component is directly connected or accessed to another component or indirectly connected or accessed through another component.

In this specification, a singular form may include a plural form as long as it is not specifically mentioned in a sentence. Furthermore, 'include/comprise' or 'including/comprising' used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

FIG. 1 is a block diagram illustrating a configuration of an apparatus for secure access controlling of a terminal according to the present disclosure.

Referring to FIG. 1, the apparatus for secure access controlling of a terminal 100 according to the present disclosure may include a communication unit 101, input unit 103, control unit 105, output unit 107, and storage unit 109.

The communication unit 101 performs data communication with an external apparatus.

According to an embodiment of the present disclosure, the communication unit 101 may perform data communication with a terminal or server to receive information related to the terminal. The communication unit 101 receives location information of the terminal collected on a predetermined cycle. The communication unit 101 may receive information on a user of the terminal besides the location information of the terminal. The information on the user may be basic information on the user including a basic path, basic moving time, location, occupation and the like. Furthermore, the information on the user may be cyber information on the user including information on using SNS, information on using electronic payment systems and the like.

According to an embodiment of the present disclosure, the communication unit 101 may receive a secure access request from the terminal, and transmit a secure access approval or rejection response to the terminal.

The input unit 103 may receive an input of a manipulation signal by the user. The input unit 103 may be configured in any format of a key pad, dome switch, touch pad (constant pressure/capacitive), jog wheel, jog switch, touch pad and the like.

According to an embodiment of the present disclosure, in response to the terminal deviating from an anticipated path, the input unit 103 may sense an input regarding whether or not to approve the current deviated location.

The control unit 105 controls overall operations of the apparatus for secure access controlling of a terminal 100. For example, the control unit 105 infers an anticipated path of the terminal based on location information of the terminal, and compares a current location of the terminal and the anticipated path of the terminal to determine whether or not the terminal deviated from the anticipated path. In response to determining that the terminal deviated from the anticipated path, the control unit 105 controls such that a secure access request of the terminal is rejected.

Operations of the control unit 105 will be explained in detail later on.

The output unit 107 outputs information processed in the apparatus for secure access controlling of a terminal 100. According to an embodiment of the present disclosure, the output unit 107 may display a UI or GUI, output an alarm sound or warning sound, or light up an LED and the like to notify whether or not the terminal deviated from the anticipated path.

The storage unit 109 may store a program, information and data necessary for operations of the apparatus for secure access controlling of a terminal 100. According to an embodiment of the present disclosure, the storage unit 109 may store information on location information and anticipated path of the terminal either permanently or temporarily.

Control operations of the control unit 105 according to the present disclosure will be explained in further detail later on.

Figure 2:
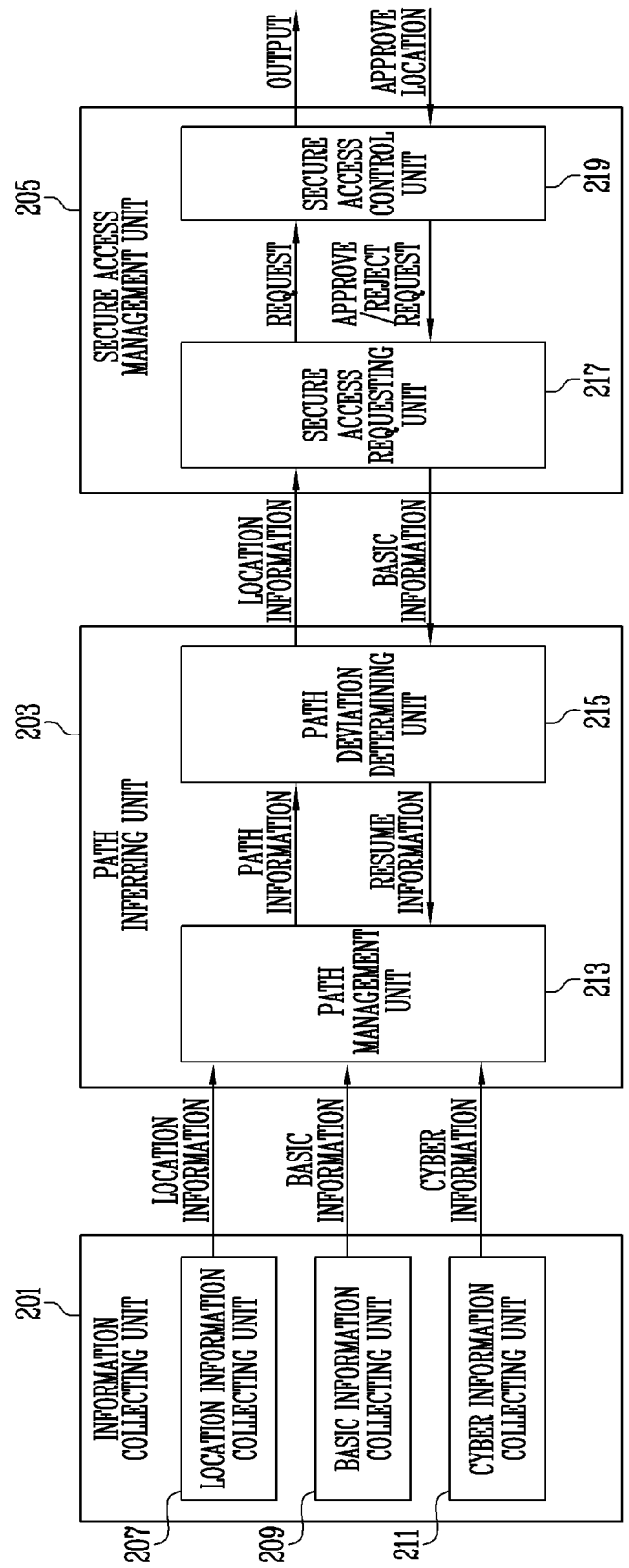
FIG. 2 is a block diagram illustrating a configuration of a control unit of an apparatus for secure access controlling of a terminal according to the present disclosure.

FIG. 2 is a block diagram illustrating a configuration of the control unit of the apparatus for secure access controlling of a terminal according to the present disclosure. FIG. 2 illustrates a logical structure of the control unit equipped in the apparatus for secure access controlling of a terminal.

Referring to FIG. 2, the control unit 200 may include an information collecting unit 201, path inferring unit 203 and secure access management unit 205.

The information collecting unit 201 collects information on a terminal and/or user of the terminal from the terminal and/or a server that manages the terminal.

Specifically, the information collecting unit 201 collects location information of the terminal on a predetermined cycle through the location information collecting unit 207. Furthermore, the information collecting unit 201 collects a basic path, basic moving time, location, occupation and the like as the basic information on the user of the terminal through the basic information collecting unit 209. Furthermore, the information collecting unit 201 collects information on using SNS and information on using electronic payment system and the like as cyber information on the user of the terminal through the cyber information collecting unit 211. The basic information and cyber information on the user of the terminal are used to improve accuracy when inferring an anticipated path of the terminal.

For the aforementioned information collecting, the information collecting unit 201 may be connected to the communication unit of the apparatus for secure access controlling of a terminal.

The information collecting unit 201 transmits the collected information to the path inferring unit 203. The information transmitted to the path inferring unit 203 is accumulated and managed in the path inferring unit 203, and used in inferring an anticipated path of the terminal.

The path inferring unit 203 infers an anticipated path of the terminal based on the information collected through the information collecting unit 201, and in response to the terminal deviating from the anticipated path, the path inferring unit 203 notifies the deviation to the secure access management unit 205.

In various embodiments of the present disclosure, an apparatus for secure access controlling of a terminal determines whether or not the terminal deviated from an anticipated path using information on a current location and accumulated location information of the terminal. K-neighbor method is a representative path anticipating method. K-neighbor method is a method of selecting k pieces of information on past locations having the highest relevance with a current location, and then comparing the selected past location information with the current location. Since all of the k pieces of information and the current location must be compared in this k-neighbor method, computations must be made k times. When k is set to a small number in order to reduce the amount of computation, the accuracy of determination on path deviation will deteriorate. Thus, when determining whether or not a terminal deviated from an anticipated location by comparing all accumulated location information and the current location of the terminal, the more accumulated the location information of the terminal is, the more amount of computation has to be performed to determine the deviation, thereby reducing the processing speed.

Therefore, in the present disclosure, an anticipated path of a terminal is inferred using accumulated location information, and then it is determined whether or not the current location deviated from the anticipated path. Furthermore, in the present disclosure, in order to improve the accuracy of determining the deviation from an anticipated path, an error range of the anticipated path is computed, and when the terminal deviated from the error range, it is determined that the terminal deviated from the anticipated path.

According to an embodiment of the present disclosure, the more number of pieces of accumulated location information there is, the more accurate the anticipated path becomes. And since whether or not the terminal deviated from the anticipated path may be confirmed by comparing the current location and a predetermined anticipated path only, it is possible to determine abnormal behaviors of the terminal more efficiently.

Furthermore, in various embodiments of the present disclosure, an apparatus for secure access controlling of a terminal may determine whether or not the terminal deviated from an anticipated path based on a sample anticipated path consisting of at least part of the anticipated paths of the terminal. Determining whether or not the terminal deviated from an anticipated path using the entire anticipated paths inferred may increase the amount of calculation required, and thus the apparatus for secure access controlling of a terminal of the present disclosure infers a sample anticipated path by extracting part from the anticipated paths inferred. In the present disclosure, a 2-phase path deviation determination method has been conceived where a sample anticipated path is compared to a current location of the terminal, and then in response to determining that the terminal deviated from the sample anticipated path, then it is determined whether or not the terminal deviated from the anticipated path based on the entire anticipated paths of the terminal. According to the embodiment of the present disclosure, the apparatus for secure access controlling of a terminal may determine whether or not the terminal deviated from the anticipated path at a faster speed and also guarantee the accuracy of the determination.

For the aforementioned operations, the path inferring unit 203 may include a path management unit 213 and path deviation determining unit 215.

The path management unit 213 infers an anticipated path of the terminal based on the information collected from the information collecting unit 201. The path management unit 213 may manage the entire anticipated paths of the terminal and/or a sample anticipated path consisting of at least part extracted from the entire anticipated paths.

The path deviation determining unit 215 may determine whether or not the terminal deviated from an anticipated path by comparing the anticipated path of the terminal with a current location of the terminal. The path deviation determining unit 215 compares a sample anticipated path of the terminal with the current location of the terminal, and in response to determining that the terminal deviated from the sample anticipated path, the path deviation determining unit 215 compares the entire anticipated paths of the terminal with the current location of the terminal, thereby determining whether or not the terminal deviated from the anticipated path.

In various embodiments of the present disclosure, the path deviation determining unit 215 computes an error range of an anticipated path of the terminal. The path deviation determining unit 215 may determine that the terminal deviated from the anticipated path when the current location of the terminal is outside the error range of the anticipated path. In an embodiment, the path deviation determining unit 215 may compute the error range of a sample anticipated path of the terminal, and when the terminal deviated from the error range of the sample anticipated path, compute the error range of the entire anticipated paths of the terminal, and determine whether or not the terminal deviated from the error range of the entire anticipated paths.

Inferring an anticipated path by the path inferring unit 203 and determining whether or not the terminal deviated from the anticipated path will be explained in further detail with reference to FIG. 3 later on.

In response to determining that the terminal deviated from an anticipated path, the path deviation determining unit 215 notifies the secure access management unit 205 that the terminal deviated from the anticipated path. In response to receiving the notification that the terminal deviated from the anticipated path from the path deviation determining unit 215, the secure access management unit 205 restricts secure access of the terminal.

The secure access management unit 205 receives a secure access request from the terminal through the secure access request unit 217. The secure access request unit 217 transmits the received secure access request and information on whether or not the terminal deviated from the anticipated path received from the path deviation determining unit 215 to the secure access control unit 219.

The secure access control unit 219 approves or rejects secure access of the terminal using the information received from the secure access request unit 217. In response to determining that the terminal deviated from the anticipated path, the secure access control unit 219 rejects secure access, and in response to determining that the terminal did not deviated from the path, the secure access control unit 219 approves the secure access. In the case of rejecting the secure access, the secure access control unit 219 may output information on the deviation from the anticipated path of the terminal and notify a managing person. For this purpose, the secure access control unit 219 may be connected to an output unit of the apparatus for secure access controlling of a terminal.

In various embodiments, the managing person may determine that the current location of the terminal that deviated from the anticipated path is a location for which secure access should be approved. In such a case, the secure access control unit 219 receives a current location approval request of the terminal through the input unit of the apparatus for secure access controlling of a terminal. The secure access control unit 219 transmits the current location approval request of the terminal to the path deviation determining unit 215. The path deviation determining unit 215 that received the current location approval request transmits the current location to the path management unit 213 so that it can be used when inferring an anticipated path in the future.

Hereinafter, the method for inferring an anticipated path and determining a path deviation of a terminal according to the present disclosure will be explained in further detail.

Figure 3:
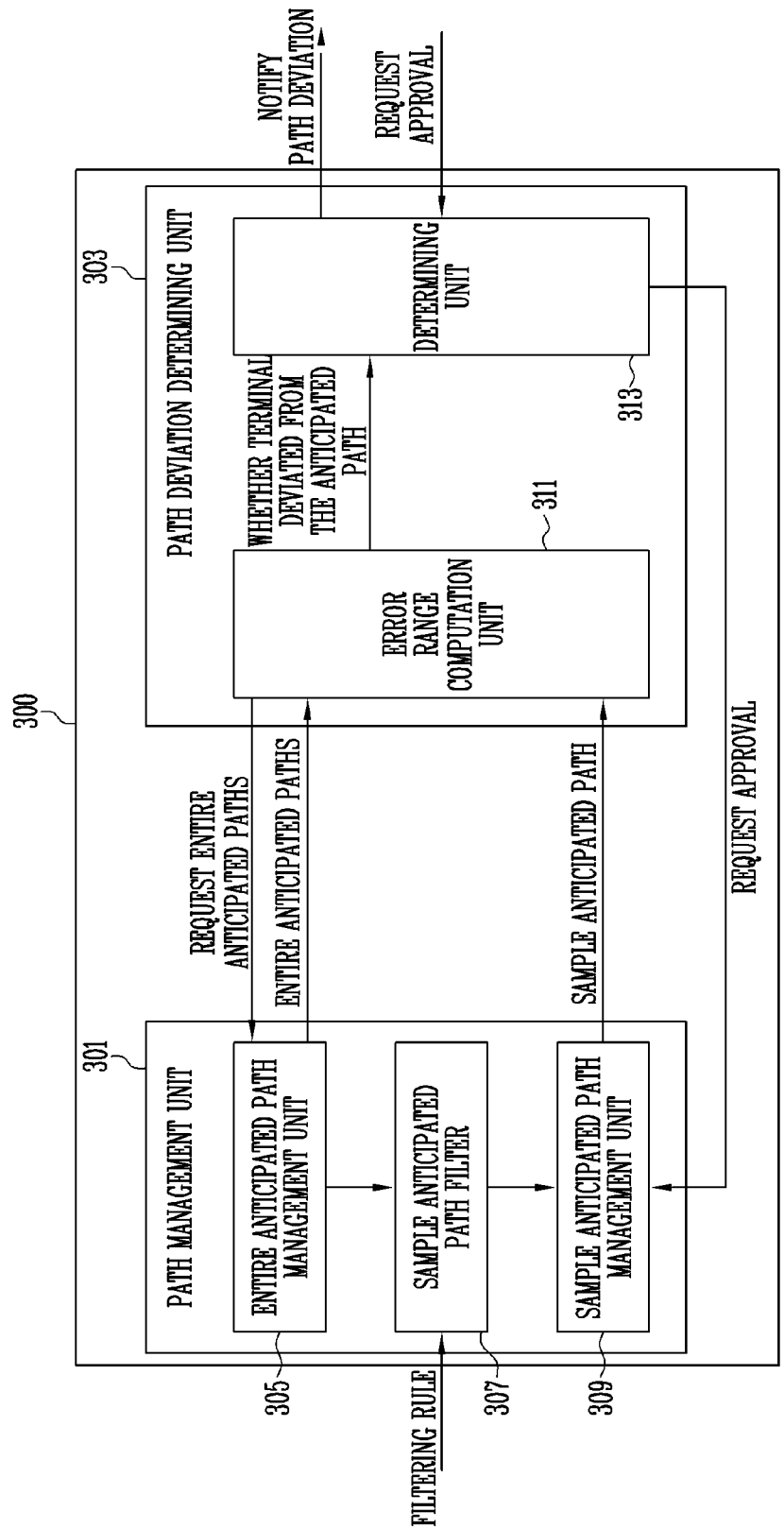
FIG. 3 is a block diagram illustrating a configuration of a path inferring unit in further detail.

FIG. 3 is a block diagram illustrating a configuration of a path inferring unit in further detail.

Referring to FIG. 3, the path inferring unit 300 according to an embodiment of the present disclosure that infers an anticipated path of a terminal and determines whether or not the terminal deviated from the path includes a path management unit 301 and path deviation determining unit 303.

The path management unit 301 infers an anticipated path of the terminal using at least one of location information, basic information and cyber information of the terminal collected. The path management unit 301 includes an entire anticipated path management unit 305, sample anticipated path filter 307, and sample anticipated path management unit 309. The entire anticipated path management unit 305 manages the entire anticipated paths of the terminal inferred. The sample anticipated path filter 307 extracts at least part of the entire anticipated paths of the terminal according to a predetermined filtering rule. A filtering rule may be determined as being any rule that enables a minimum number of sample location information to be extracted within a range where the accuracy of the sample anticipated path is guaranteed. The filtering rule may be input directly by the managing person of the apparatus for secure access controlling of a terminal. The sample anticipated path management unit 309 manages the at least part of the anticipated paths extracted by the sample anticipated path filter 308 as a sample anticipated path.

The path anticipated determining unit 303 obtains an anticipated path of the terminal from the path management unit 301, determines whether or not the terminal deviated from the anticipated path, and in response to determining that the terminal deviated from the anticipated path, notifies the deviation to the secure access management unit.

In various embodiments of the present disclosure, the path deviation determining unit 303 may first determine whether or not the terminal deviated from the sample anticipated path based on the sample anticipated path stored in the sample anticipated path management unit 309. In response to determining that the terminal deviated from the sample anticipated path, the path deviation determining unit 303 may determine whether or not the terminal deviated from the anticipated path based on the entire anticipated paths stored in the entire anticipated path management unit 305.

In various embodiments of the present disclosure, the path deviation determining unit 303 may compute an error range of an anticipated path through the error range computation unit 311, and when the terminal deviated from the error range, the determining unit 313 may determine that the terminal deviated from the anticipated path.

An error range of an anticipated path may be computed by various methods. In an embodiment of the present disclosure, an error range of an anticipated path may consist of a circle having the location at a first time point as the center and a radius of a difference between the location at the first time point and a location at a second time point that comes before the first time point. Detailed explanation of the aforementioned is as follows.

Figure 4:
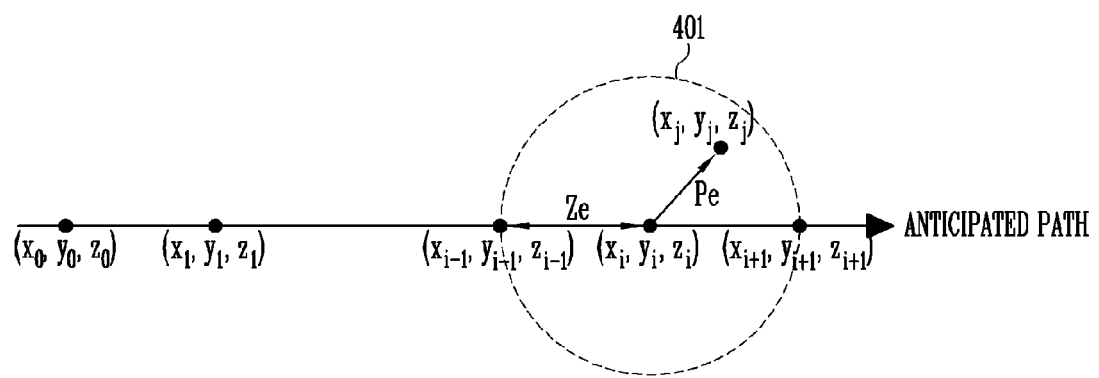
FIG. 4 is a view for explaining a method for computing an error range of an anticipated path according to the present disclosure.

In FIG. 4, the location of the terminal at a first time point, i, which is a past point is $(x_i, y_i, z_i)$, and the location of the terminal at a second time point, i−1, is $(x_{i-1}, y_{i-1}, z_{i-1})$. Herein, in a case where the location information of the terminal is collected on a cycle of T, the first time point and the second time point may have an interval of cycle T. Herein, an anticipated path of the terminal may be located on a straight line that connects $(x_i, y_i, z_i)$ and $(x_{i-1}, y_{i-1}, z_{i-1})$. Accordingly, it may be inferred that the location of the terminal at a time point of i+1 is $(x_{i+1}, y_{i+1}, z_{i+1})$. The error range of the anticipated path of the terminal at the time point of i+1 may consist of a circle 401 having the location at the first time point, $(x_i, y_i, z_i)$, as the center, and a difference between the location at the first time point, $(x_i, y_i, z_i)$, and the location at a second time point, $(x_{i-1}, y_{i-1}, z_{i-1})$, as a radius of $Z_e$. The radius, $Z_e$, may be expressed as in math equation 1 below.

$$Z_e = (x_i, y_i, z_i) - (X_{i-1}, y_{i-1}, z_{i-1})$$ [Math equation 1]

Supposing the current location of the terminal at a current point, j, that is before one cycle passes, from the first time point, i, is $(x_j, y_j, z_j)$, (that is, i≤j≤i+1), the difference, $p_e$, between the current location, $(x_j, y_j, z_j)$, and the location at the first time point, i, $(x_i, y_i, z_i)$, is as in math equation 2 below.

$$p_e = abs[(x_j, y_j, z_j) - (x_i, y_i, z_i)]$$ [Math equation 2]

When $p_e$ is smaller than $Z_e$, the current location of the terminal, $(x_j, y_j, z_j)$, exists within the error range of the anticipated path. On the other hand, when $p_e$ is greater than $Z_e$, the current location of the terminal, $(x_j, y_j, z_j)$, exists outside the error range of the anticipated path. When $p_e$ is smaller than $Z_e$, the determining unit 313 determines that the terminal did not deviate from the anticipated path, but when $p_e$ is greater than $Z_e$, the determining unit 313 determines that the terminal deviated from the anticipated path.

When it is determined that the terminal deviated from the path, the determining unit 313 notifies the secure access management unit that the terminal deviated from the path. In response to receiving a request to approve the current location from the secure access management unit, the determining unit 313 may transmit the request to the path management unit 301 so that an anticipated path may be re-inferred based on the current location.

Hereinafter, explanation will be made on the overall operations of a secure access control according to a configuration of the apparatus for secure access controlling of a terminal mentioned above.

Figure 5:
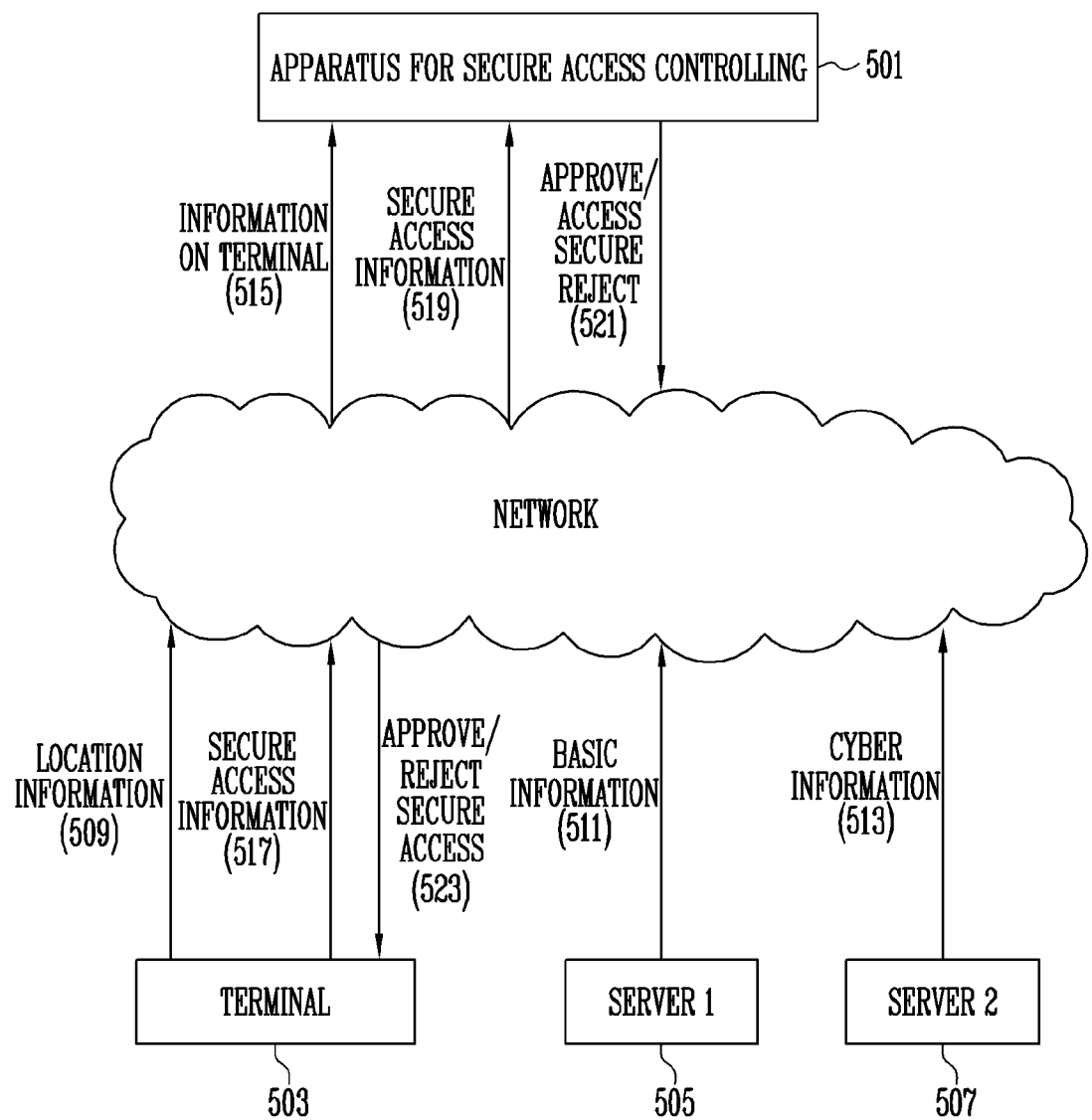
FIG. 5 is a flowchart illustrating a method for secure access controlling of a terminal according to the present disclosure.

FIG. 5 is a flowchart illustrating a method for secure access controlling of a terminal according to the present disclosure.

Referring to FIG. 5, the apparatus for secure access controlling of a terminal 501 is connected to a terminal 503 through a network. The apparatus for secure access controlling of a terminal 501 may be connected to at least one server 505, 507 that manages information on a user of the terminal through the network. The location information of the terminal 503 may be collected on a predetermined cycle 509. Furthermore, basic information and cyber information on the user of the terminal 503 may also be collected 511, 513. The apparatus for secure access controlling of a terminal 501 obtains collected information 515. The apparatus for secure access controlling of a terminal 501 infers an anticipated path of the terminal 503 according to an embodiment of the present disclosure based on the obtained information.

In response to receiving a secure access request from the terminal 503, 517, the apparatus for secure access controlling of a terminal 501 obtains secure access information such as an anticipated path corresponding to the terminal 503 that requested secure access and the current location of the terminal 503, 519. The apparatus for secure access of controlling of a terminal 501 determines whether or not the terminal deviated from the anticipated path using the anticipated path and the current location of the terminal 503 according to an embodiment of the present disclosure, and approves or rejects secure access of the terminal 503 according to the determined result 521.

The terminal 503 proceeds or stops the secure access according to the secure access approval or rejection 523.

Figure 6:
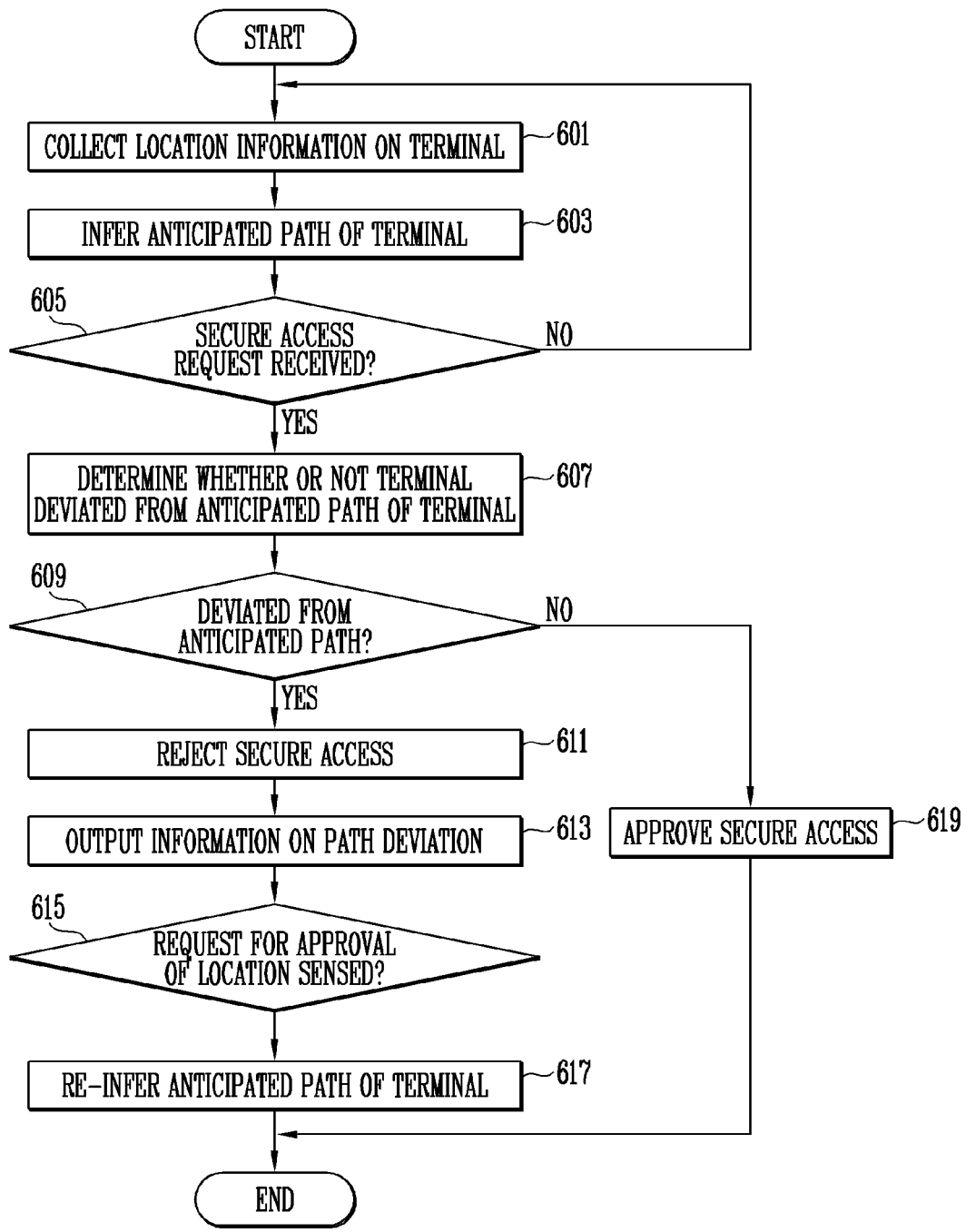
FIG. 6 is a flowchart illustrating a method for secure access controlling of a terminal according to the present disclosure.

FIG. 6 is a flowchart illustrating a method for secure access controlling of a terminal according to the present disclosure.

Referring to FIG. 6, the apparatus for secure access controlling of a terminal collects location information of the terminal 601. The apparatus for secure access controlling of a terminal collects location information of the terminal on a predetermined cycle. In various embodiments, the apparatus for secure access controlling of a terminal collects basic information, basic moving time, location, and occupation and the like as basic information of the user of the terminal. Furthermore, the apparatus for secure access controlling of a terminal collects information on using SNS, and information on using electronic payment systems and the like as cyber information on the user of the terminal through the cyber information collecting unit 211.

The apparatus for secure access controlling of a terminal infers an anticipated path of the terminal based on the collected location information of the terminal 603. In various embodiments, the apparatus for secure access controlling of a terminal may infer a sample anticipated path that consists of at least part of the anticipated paths of the terminal.

In response to receiving a secure access request from the terminal 605, the apparatus for secure access controlling of a terminal determines whether or not the terminal deviated from the anticipated path 607. A method for secure access controlling of a terminal is illustrated in detail in FIG. 7.

Figure 7:
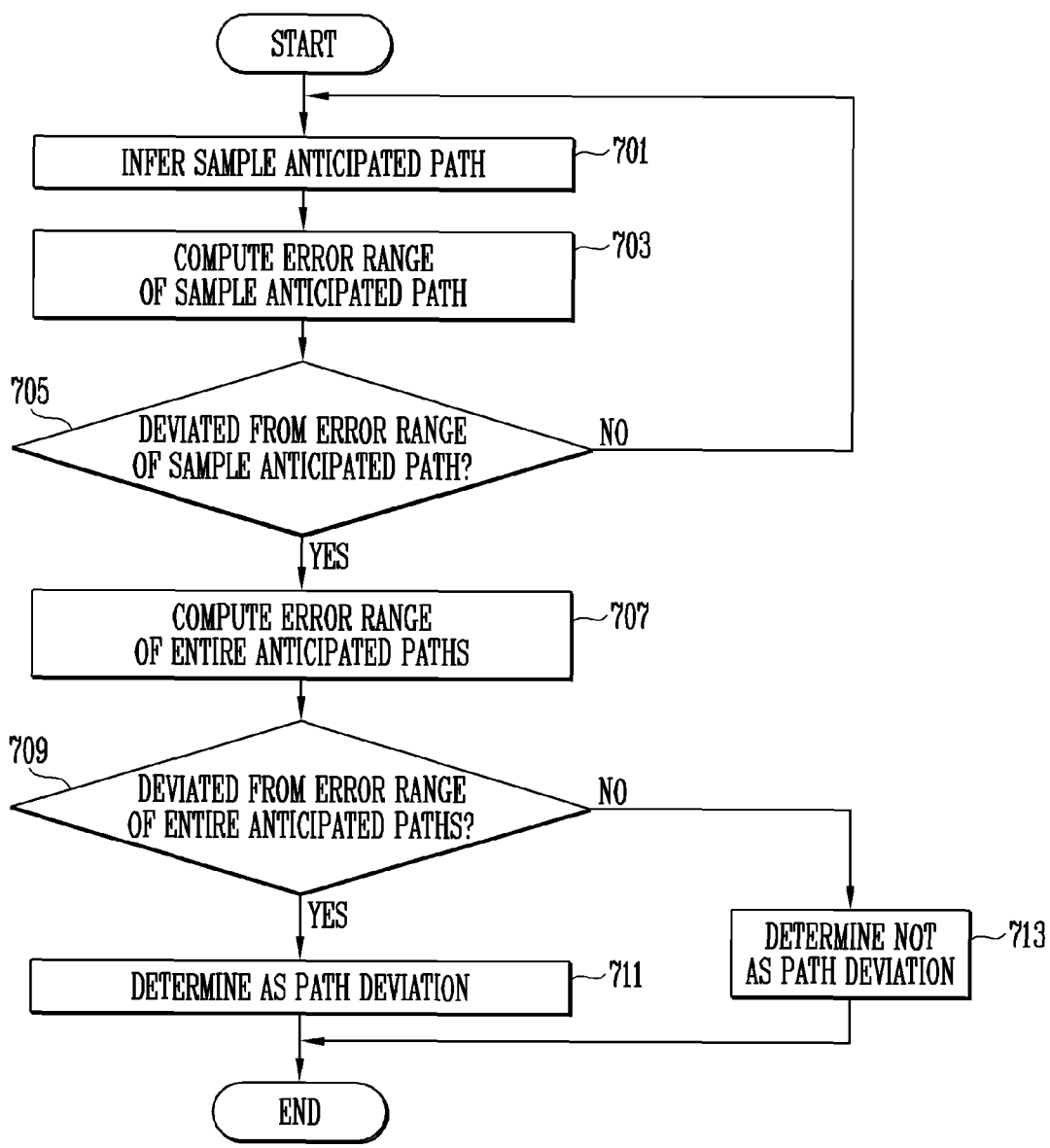
FIG. 7 is a flow chart illustrating a method for secure access controlling of a terminal.

Referring to FIG. 7, the apparatus for secure access controlling of a terminal infers a sample anticipated path 701. The apparatus for secure access controlling of a terminal extracts at least part of the entire anticipated paths of the terminal according to a predetermined filtering rule. A filtering rule may be determined as being any rule that enables a minimum number of sample location information to be extracted within a range where the accuracy of the sample anticipated path is guaranteed. The filtering rule may be input directly by a managing person of the apparatus for secure access controlling of a terminal. The apparatus for secure access controlling of a terminal infers the at least part of the anticipated paths extracted by the sample anticipated path filter as a sample anticipated path.

The apparatus for secure access controlling of a terminal computes an error range of the sample anticipated path 703. An error range of an anticipated path may consist of a circle having the location at a first time point as the center and a radius of a difference between the location at the first time point and a location of a second time point that comes before the first time point.

The apparatus for secure access controlling of a terminal determines whether or not the terminal deviated from the error range of the sample anticipated path 705. When the terminal did not deviate from the error range of the sample anticipated path, the apparatus for secure access controlling of a terminal determines that the terminal did not deviate from the anticipated path 713.

When the terminal did not deviate from the error range of the sample anticipated path, the apparatus for secure access controlling of a terminal computes an error range of the entire anticipated paths of the terminal 707. An error range may consist of a circle having the location at a first time point as the center and a radius of a difference between the location at the first time point and a location of a second time point that comes before the first time point.

The apparatus for secure access controlling of a terminal determines whether or not the terminal deviated from the error range of the entire anticipated paths 709. When the terminal did not deviate from the error range of the entire anticipated paths, the apparatus for secure access controlling of a terminal determines that the terminal did not deviate from the entire anticipated paths 713. To the contrary, when the terminal deviated from the error range of the entire anticipated paths, the apparatus for secure access controlling of a terminal determines that the terminal deviated from the entire anticipated paths 711.

In response to determining that the terminal did not deviate from the anticipated paths as a result of determining deviation of the terminal 609, the apparatus for secure access controlling of a terminal approves secure access of the terminal 609.

Meanwhile, in response to determining that the terminal deviated from the anticipated paths, the apparatus for secure access controlling of a terminal rejects secure access of the terminal 611. In an embodiment, the apparatus for secure access controlling of a terminal may output information for notifying that the terminal deviated from the anticipated paths 613. The apparatus for secure access controlling of a terminal may display a UI or GUI, output an alarm sound or warning sound, or light up an LED and the like to notify whether or not the terminal deviated from the anticipated paths. In an embodiment, a managing person of the apparatus for secure access controlling of a terminal may request approval for a current location that deviated from the anticipated paths. In response to sensing the current location approval request 615, the apparatus for secure access controlling of a terminal may re-infer the anticipated path of the terminal using the current location 617. The re-inferred anticipated path is used to control secure access of the terminal.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A method for an apparatus to control secure access controlling of a terminal, the apparatus comprising a controller configured to perform the steps of the method comprising:

inferring an anticipated path of the terminal based on location information of the terminal collected on a predetermined cycle;

determining whether or not the terminal deviated from the anticipated path by comparing a current location of the terminal and the anticipated path; and rejecting, when the terminal deviated from the anticipated path, a secure access request of the terminal unless an approval for location deviation is obtained upon a terminal managing person submitting a location approval request to an input unit within the terminal upon a notification received by the terminal managing person that the terminal has deviated from the anticipated path.

2. The method according to claim 1, wherein the program code that determines whether or not the terminal deviated from the anticipated path comprises:

program code that determines whether or not the terminal deviated from a sample anticipated path that consists of at least part of the anticipated path; and program code that determines, when the terminal deviated from the sample anticipated path, whether or not the terminal deviated from the entire anticipated path.

3. The method according to claim 1, wherein the program code that determines whether or not the terminal deviated from the anticipated path comprises:

program code that computes an error range of the anticipated path based on the location information of the terminal collected on the predetermined cycle; and program code that determines, when the current location of the terminal being outside the error range of the anticipated path, that the terminal deviated from the anticipated path.

4. The method according to claim 3, wherein the error range of the anticipated path consists of a circle having a location of the terminal at a first time point as a center, and a difference between the location of the terminal at the first time point and a location of the terminal at a second time point that comes before the first time point as a radius.

5. The method according to claim 1, further comprising, program code that outputs, when the terminal deviated from the anticipated path, information on deviation from the anticipated path.

6. The method according to claim 5, further comprising, program code that re-infers, when the request for approval of the current location is sensed in response to the information on the deviation from the anticipated path of the terminal, the anticipated path based on the current location.

7. The method according to claim 1, further comprising program code that collects information on a user of the terminal, and wherein inferring the anticipated path comprises inferring the anticipated path based on the information on the user of the terminal.

8. An apparatus for secure access controlling of a terminal, the apparatus comprising:

a communication unit configured to receive location information of the terminal collected on a predetermined cycle; and a control unit configured to infer an anticipated path of the terminal based on the location information of the terminal collected on the predetermined cycle, compare a current location of the terminal and the anticipated path, determine whether or not the terminal deviated from the anticipated path, reject, when the terminal deviated from the anticipated path, a secure access request of the terminal unless an approval for location deviation is obtained upon a terminal managing person submitting a location approval request to an input unit within the terminal upon a notification received by the terminal managing person that the terminal has deviated from the anticipated path.

9. The apparatus according to claim 8, wherein the control unit determines whether or not the terminal deviated from a sample anticipated path that consists of at least part of the anticipated path, and determines, when the terminal deviated from the sample anticipated path, that the terminal deviated from the entire anticipated path.

10. The apparatus according to claim 8, wherein the control unit computes an error range of the anticipated path based on the location information of the terminal collected on the predetermined cycle, and determines, when the current location of the terminal being outside the error range of the anticipated path, that the terminal deviated from the anticipated path.

11. The apparatus according to claim 10, wherein the error range of the anticipated path consists of a circle having a location of the terminal at a first time point as a center, and a difference between the location of the terminal at the first time point and a location of the terminal at a second time point that comes before the first time point as a radius.

12. The apparatus according to claim 8, further comprising an output unit configured to, output, when the terminal deviated from the anticipated path, information on deviation from the anticipated path.

13. The apparatus according to claim 12, wherein the control unit, re-infers, when the request for approval of the current location is sensed in response to the information on the deviation from the anticipated path of the terminal, the anticipated path based on the current location.

14. The apparatus according to claim 8, wherein the communication unit receives information on a user of the terminal, and the control unit infers the anticipated path based on the information on the user of the terminal.

* * * * *